(12) United States Patent
Hsiang

(10) Patent No.: US 11,496,037 B2
(45) Date of Patent: Nov. 8, 2022

(54) POWER SUPPLY HAVING BIDIRECTIONAL GATE DRIVING IMPULSE TRANSFORMER AND CONTROL METHOD THEREOF

(71) Applicant: ACBEL POLYTECH INC., New Taipei (TW)

(72) Inventor: Chia-Chih Hsiang, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 39 days.

(21) Appl. No.: 17/207,098

(22) Filed: Mar. 19, 2021

(65) Prior Publication Data

US 2022/0302847 A1 Sep. 22, 2022

(51) Int. Cl.
*H02M 1/08* (2006.01)
*H02M 1/00* (2006.01)
*H02M 1/42* (2007.01)
*H02M 3/335* (2006.01)

(52) U.S. Cl.
CPC ....... *H02M 1/0064* (2021.05); *H02M 1/0003* (2021.05); *H02M 1/08* (2013.01); *H02M 1/4225* (2013.01); *H02M 3/33592* (2013.01)

(58) Field of Classification Search
CPC ......... H02M 3/33584; H02M 3/33592; H02M 1/0003; H02M 1/0064; H02M 1/08; H02M 1/4225
See application file for complete search history.

(56) References Cited

U.S. PATENT DOCUMENTS

| 9,906,150 B1 * | 2/2018 | Xie | H02M 3/33584 |
| 10,193,457 B1 * | 1/2019 | Hande | H02M 3/33592 |
| 2016/0352231 A1 * | 12/2016 | Quigley | H02M 3/33592 |

* cited by examiner

*Primary Examiner* — Kyle J Moody
*Assistant Examiner* — Jye-June Lee
(74) *Attorney, Agent, or Firm* — Rabin & Berdo, P.C.

(57) ABSTRACT

A power supply having a bidirectional gate driving impulse transformer. The power supply includes a transformer, a first Buck converter, the bidirectional gate driving impulse transformer, a primary side controller, a secondary side controller, a first optocoupler, and a second optocoupler; the transformer voltage-transforms a power input from a power inlet and generates an output voltage; the first Buck converter bucks the power input from the power inlet and generates a power voltage; the bidirectional gate driving impulse transformer is powered by either the output voltage or the power voltage; the primary side controller is powered by the power voltage, and the secondary side controller is powered by the output voltage; wherein the bidirectional gate driving impulse transformer drives the transformer according to either a primary side control signal from the primary side controller or a secondary side control signal from the secondary side controller.

12 Claims, 10 Drawing Sheets

POWER SUPPLY HAVING BIDIRECTIONAL GATE DRIVING IMPULSE TRANSFORMER AND CONTROL METHOD THEREOF

BACKGROUND OF THE INVENTION

1. Field of the Invention

The present invention relates to a power supply having a bidirectional gate driving impulse transformer and a control method thereof with an overall increase in power conversion efficiency, a decrease in size, and a decrease in production cost.

2. Description of the Related Art

With respect to FIG. 8, a conventional power supply includes a transformer 100, a Flyback converter 110, a primary side controller 120, a secondary side controller 130, a driver winding module 140, and an optocoupler 150. The conventional power supply further includes a power inlet 4, a major power outlet 5, and a secondary power outlet 6. A filter 101, a first rectifier 102, and a boost converter 103 are connectable between the transformer 100 and the power inlet 4. An inlet of the filter 101 is connected with a power input through the power inlet 4, wherein the power input is an Alternating Current (AC) power source, and an Electromagnetic Interference (EMI) of the AC power source is filtered by the filter 101. An inlet of the first rectifier 102 is electrically connected with an outlet of the filter 101, wherein the first rectifier 102 would convert the filtered AC power source into a Direct Current (DC) power source. An inlet of the boost converter 103 is electrically connected with an outlet of the first rectifier 102, wherein the rectified DC power source is boosted by the boost converter 103. An inlet of the transformer 100 is electrically connected with an outlet of the boost converter 103, wherein the boosted DC power source is voltage-transformed by the transformer 100, generating a major output voltage.

A second rectifier 104, a first current sensor 105, and a first protective component 106 are connected between the transformer 100 and the major power outlet 5. An inlet of the second rectifier 104 is electrically connected to an outlet of the transformer 100, and an outlet of the second rectifier 104 is electrically connected to the major power outlet 5. The major output voltage is rectified by the second rectifier 104. An inlet of the first current sensor 105 is electrically connected to the outlet of the second rectifier 104 for current sensing the rectified major output voltage. An inlet of the first protective component 106 is electrically connected to an outlet of the first current sensor 105, and an outlet of the first protective component 106 is connected to the major power outlet 5.

The Flyback converter 110 and a second protective component 111 are connected between the transformer 100 and the secondary power outlet 6. An inlet of the Flyback converter 110 is electrically connected to the outlet of the boost converter 103. The boosted DC power source is voltage-transformed by the Flyback converter 110, and generates a secondary output voltage to the secondary power outlet 6. An inlet of the second protective component 111 is electrically connected to an outlet of the Flyback converter 110, and the Flyback converter 110 is also electrically connected to the primary side controller 120 and the secondary side controller 130. The Flyback converter 110 voltage-transforms the boosted DC power source, generating a power voltage for powering the primary side controller 120 and the secondary side controller 130.

The primary side controller 120 is connectable with the filter 101, the first rectifier 102, and the boost converter 103, for sensing a primary side voltage and a primary side current on the primary side of the transformer 100. The secondary side controller 130 can connect with the driver winding module 140, the second rectifier 104, the first current sensor 105, and the first protective component 106, for sensing a secondary side voltage and a secondary side current on the secondary side of the transformer 100, for controlling the first protective component 106, and for outputting a control signal to the driver winding module 140 for driving the transformer 100. The optocoupler 150 is connected between the primary side controller 120 and the secondary side controller 130, providing bidirectional signal transportation between the primary side controller 120 and the secondary side controller 130.

With respect to FIG. 9, a conventional method used to sense whether an entering current through the inlet of the transformer 100 is acceptable below a current threshold is to mount a second current sensor 107 between the transformer 100 and the boost converter 103, and to output a current sampling signal VCS from the second current sensor 107. Since how the transformer 100 should work is determined and controlled by the secondary side controller 130, an isolating current sensor of a current transformer type is needed additionally to be mounted on the primary side of the transformer 100 in order to transport the current sampling signal VCS from the primary side of the transformer 100 to the secondary side controller 130 on the secondary side through the current transformer. However, compared to non-isolating components, isolating components require extra isolating structures such as windings in order to ensure a complete electrical isolation between both sides of the isolating components. Therefore, the isolating components are generally bigger in size than the non-isolating components, making conventional power supplies with mounted isolating current sensors quite big. By mounting the isolating components, such big size power supplies are not only against current market demands in both size and weights, but also quite costly to produce.

Furthermore, as the DC power source is being voltage-transformed by the Flyback converter 110, a secondary output voltage is being outputted from the secondary power outlet 6, and the power voltage is powering the primary side controller 120 and the secondary side controller 130. In other words, the Flyback converter 110 is outputting many voltage sources. A transformer typically has an iron core and windings, and for a typical transformer to satisfy the needs of outputting multiple voltage sources, the typical transformer would require multiple iron cores and multiple windings. The multiple iron cores and windings would require a lot of space inside of the typical transformer, making the typical transformer big in size for outputting multiple voltage sources. Therefore, the conventional power supply with the Flyback converter 110 outputting multiple voltage sources would be big in size. Apart from the size issue, when voltage-transforming multiple voltages, the Flyback converter 110 would waste power for every voltage-transformation, making the typical power supply unable to raise a power conversion efficiency.

SUMMARY OF THE INVENTION

To overcome limitations mentioned above, a power supply having a bidirectional gate driving impulse transformer of the present invention improves from a conventional power supply by having better conversion efficiency, less production cost, and smaller overall size.

The power supply of the present invention includes:

a transformer, including an inlet and an outlet; wherein the inlet is electrically connected to a power inlet, the outlet is electrically connected to a major power outlet, and the transformer is voltage-transforming a power input of the power inlet to generate an output voltage;

a first Buck converter, electrically connecting between the power inlet and the inlet of the transformer, and generating a power voltage by bucking the power input from the power inlet;

the bidirectional gate driving impulse transformer, electrically connecting the transformer and the first buck converter, and powered by either the power voltage or the output voltage;

a primary side controller, electrically connecting the first buck converter and the bidirectional gate driving impulse transformer, and powered by the power voltage;

a secondary side controller, electrically connecting the outlet of the transformer and the bidirectional gate driving impulse transformer, and powered by the output voltage;

a first optocoupler, electrically connecting between the primary side controller and the secondary side controller, providing a bidirectional signal transportation between the primary side controller and the secondary side controller;

a second optocoupler, electrically connecting between the primary side controller and the secondary side controller, providing a one-directional signal transportation from the secondary side controller to the primary side controller; wherein a primary side control signal is outputted from the primary side controller to the bidirectional gate driving impulse transformer, a secondary side control signal is outputted from the secondary side controller to the bidirectional gate driving impulse transformer, and the transformer is driven according to either the primary side control signal or the secondary side control signal received by the bidirectional gate driving impulse transformer.

The present invention further provides a control method of a having a bidirectional gate driving impulse transformer, executed by a primary side controller and a secondary side controller, wherein the primary side controller executes steps of:

starting by accepting a power voltage;

determining whether an input voltage of a transformer is greater than or equal to a working voltage, and determining whether a present start is a first start in a default time; and outputting a primary side control signal to the bidirectional gate driving impulse transformer for driving the transformer when the input voltage of the transformer is greater than or equal to the working voltage and the present start is the first start in the default time; and wherein the secondary side controller executes steps of:

outputting an authority change signal for stopping the primary side control signal and outputting a secondary side control signal to the bidirectional gate driving impulse transformer for driving the transformer when an output voltage of the transformer is greater than or equal to a default output voltage, and a time during which the output voltage of the transformer is greater than or equal to the default output voltage is longer than a steady power supplying threshold time.

In the power supply of present invention, the primary side controller is powered by the power voltage from the first buck converter, and the secondary side controller is powered by the output voltage from the transformer. The primary side controller and the secondary side controller both can control the transformer through the bidirectional gate driving impulse transformer. Comparing to a conventional power supply with multiple isolating components, the present invention also omits additionally mounting a Flyback converter in the conventional power supply for powering the primary side controller and the secondary side controller, not only decreasing the overall size and the production cost, but also improving the power conversion efficiency without additional voltage-transformations from the Flyback converter.

Additionally, through driving the controller with steps of the primary side control signal and steps of the secondary side control signal, the power supply control method of the present invention is able to control the transformer from the primary side controller and the secondary side controller. Without passing the primary side control signal through any isolating components, the present invention decreases the overall size of the power supply without any isolating components. Also without having a Flyback converter to control, the power supply control method of the present invention omits powering the primary side controller and the secondary side controller individually from the Flyback converter, not only decreasing the overall size and the production cost, but also improving the power conversion efficiency without additional voltage-transformations from the Flyback converter.

DETAILED DESCRIPTION OF THE INVENTION

Figure 1:
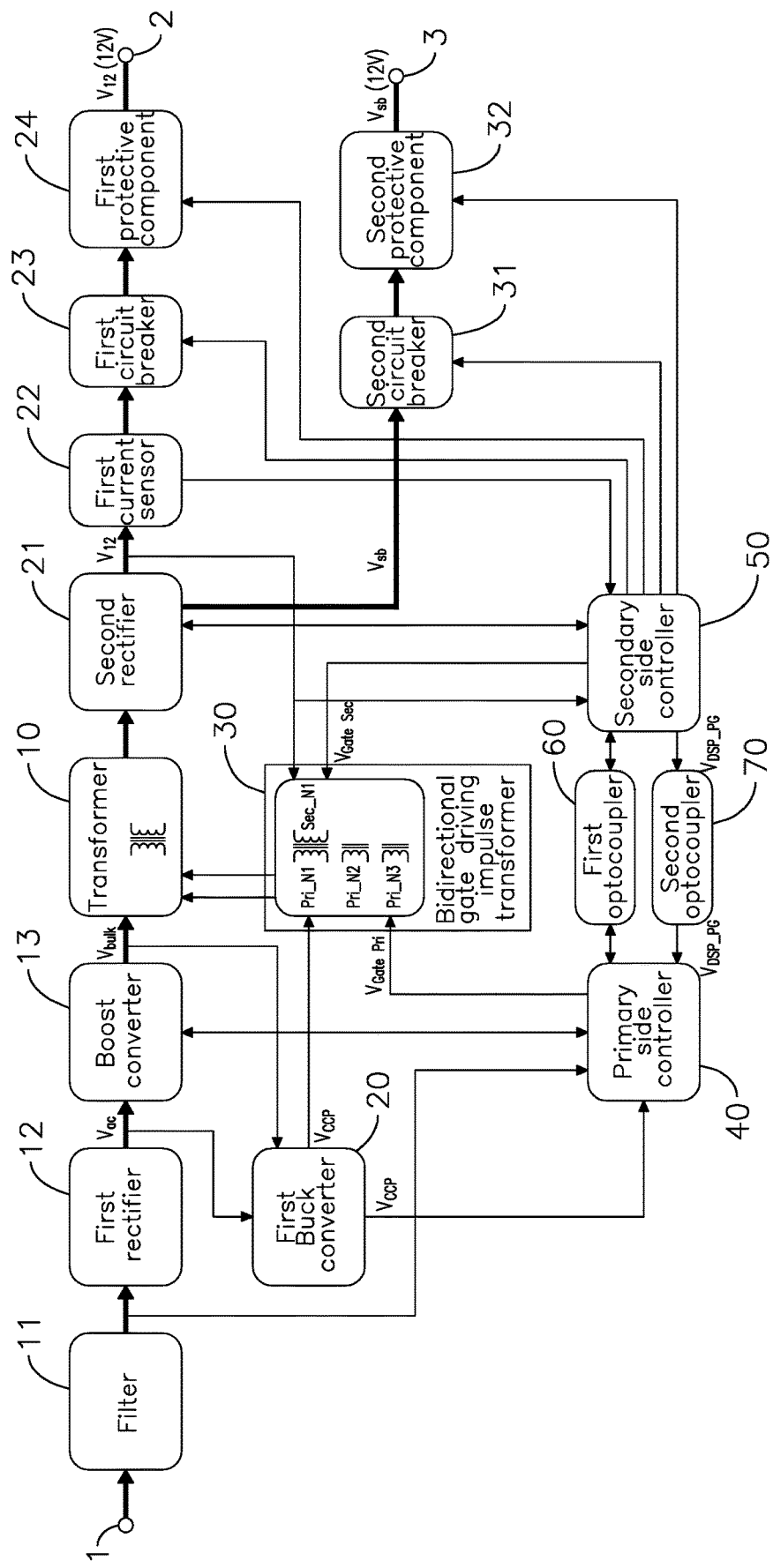
FIG. 1 is a first circuit block diagram of a power supply having a bidirectional gate driving impulse transformer of the present invention.

With reference to FIG. 1, in an embodiment of the present invention, a power supply having a bidirectional gate driving impulse transformer 30 includes a transformer 10, a buck converter 20, the bidirectional gate driving impulse transformer 30, a primary side controller 40, a secondary side controller 50, a first optocoupler 60, and a second optocoupler 70.

In the embodiment of the present invention, a filter 11, a first rectifier 12, and a boost converter 13 are connectable between the transformer 10 and a power inlet 1. An inlet of the filter 11 is connected with a power input of the power inlet 1. The power input is an Alternating Current (AC) power source, and the filter 11 is used to filter an Electromagnetic Interference (EMI) signal from the AC power source, minimizing a conducted noise and a radiated noise in the AC power source. In the embodiment of the present invention, the filter 11 is an EMI filter.

An inlet of the first rectifier 12 is electrically connected to an outlet of the filter 11. The first rectifier 12 would convert the filtered AC power source into a Direct Current (DC) power source and output a first voltage $V_{ac}$ from an outlet of the first rectifier 12. In the embodiment of the present invention, the first rectifier 12 is a Bridge rectifier.

An inlet of the boost converter 13 is electrically connected to the outlet of the first rectifier 12. The first voltage $V_{ac}$ is boosted into a second voltage $V_{bulk}$ by the boost converter 13. In the embodiment of the present invention, a Power Factor Correction (PFC) circuit and an inrush current limiter can be included in the boost converter 13. The PFC circuit can increase a Power Factor (PF) of the power supply and the inrush current limiter can minimize effects of an inrush current on the power supply, protecting the power supply. In the embodiment of the present invention, the boost converter 13 is able to boost the first voltage $V_{ac}$ into the second voltage $V_{bulk}$ of around 380V to 410V, though the second voltage $V_{bulk}$ is not limited to this voltage range.

An inlet of the transformer 10 is electrically connected to an outlet of the boost converter 13. The boosted DC power source is voltage-transformed by the transformer 10 to generate an output voltage.

In the embodiment of the present invention, the transformer 10, a major power outlet 2, and a secondary power outlet 3 are connected to a second rectifier 21. An inlet of the second rectifier 21 is electrically connected to an outlet of the transformer 10. An outlet of the second rectifier 21 respectively connects the major power outlet 2 and the secondary power outlet 3, rectifying the output voltage generated from the transformer 10 with the second rectifier 21, and outputting a major output voltage $V_{12}$ from the major power outlet 2 and a secondary output voltage $V_{sb}$ from the secondary power outlet 3. In the embodiment of the present invention, the transformer 10 is a Half-Bridge LLC converter, and the second rectifier 21 is a synchronous rectifier. The transformer 10 is able to buck the DC power source down to 12 V, meaning the major output voltage $V_{12}$ and the secondary output voltage $V_{sb}$ are both 12 V. Models for the transformer 10 and the second rectifier 21, and the output voltage are free from specifications described above in the embodiment of the present invention.

In a preferred embodiment of the present invention, a first current sensor 22, a first circuit breaker 23, and a first protective component 24 are connectable between the second rectifier 21 and the major power outlet 2. An inlet of the first current sensor 22 is electrically connected to the outlet of the second rectifier 21, current sensing the rectified output voltage from the second rectifier 21. An inlet of the first circuit breaker 23 is electrically connected to an outlet of the first current sensor 22. The secondary side controller 50 of the power supply is able to control whether the first circuit breaker 23 stays open or closed depending on whether the major output voltage $V_{12}$ is stable. More particularly, when the major output voltage $V_{12}$ is stable, the first circuit breaker 23 stays closed, conducting electricity, and when the major output voltage $V_{12}$ is unstable, the first circuit breaker 23 stays open, disconnecting and ensuring the unstable major output voltage $V_{12}$ is unable to damage any electronic components after the major power outlet 2. An inlet of the first protective component 24 is electrically connected to an outlet of the first circuit breaker 23, and an outlet of the first protective component 24 is electrically connected to the major power outlet 2. The first protective component 24 is used to prevent an impulse from electric components connected after the major power outlet 2 from backflowing to the power supply from the major power outlet 2 and interfering with the power supply.

Similarly, a second circuit breaker 31 and a second protective component 32 are connectable between the second rectifier 21 and the secondary power outlet 3. An inlet of the second circuit breaker 31 is electrically connected to the outlet of the second rectifier 21. The secondary side controller 50 of the power supply is able to control whether the second circuit breaker 31 stays open or closed depending on whether the secondary output voltage $V_{sb}$ is stable. More particularly, when the secondary output voltage $V_{sb}$ is stable, the second circuit breaker 31 stays closed, conducting electricity, and when the secondary output voltage $V_{sb}$ is unstable, the second circuit breaker 31 stays open, disconnecting and ensuring the unstable secondary output voltage $V_{sb}$ is unable to damage any electronic components after the secondary power outlet 3. An inlet of the second protective component 32 is electrically connected to an outlet of the second circuit breaker 31, and an outlet of the second protective component 32 is electrically connected to the secondary power outlet 3. The second protective component 32 is used to prevent an impulse from electric components connected after the secondary power outlet 3 from backflowing to the power supply from the secondary power outlet 3 and interfering with the power supply. In the embodiment for the present invention, the first circuit breaker 23 and the second circuit breaker 31 can be a Metal-Oxide Semiconductor Field-Effect Transistor (MOSFET) respectively. The first protective component 24 and the second protective component 32 can each be an Or-ing MOSFET respectively, but the first circuit breaker 23, the second circuit breaker 31, the first protective component 24, and the second protective component 32 are free from specifications described above in the embodiment of the present invention.

Figure 2:
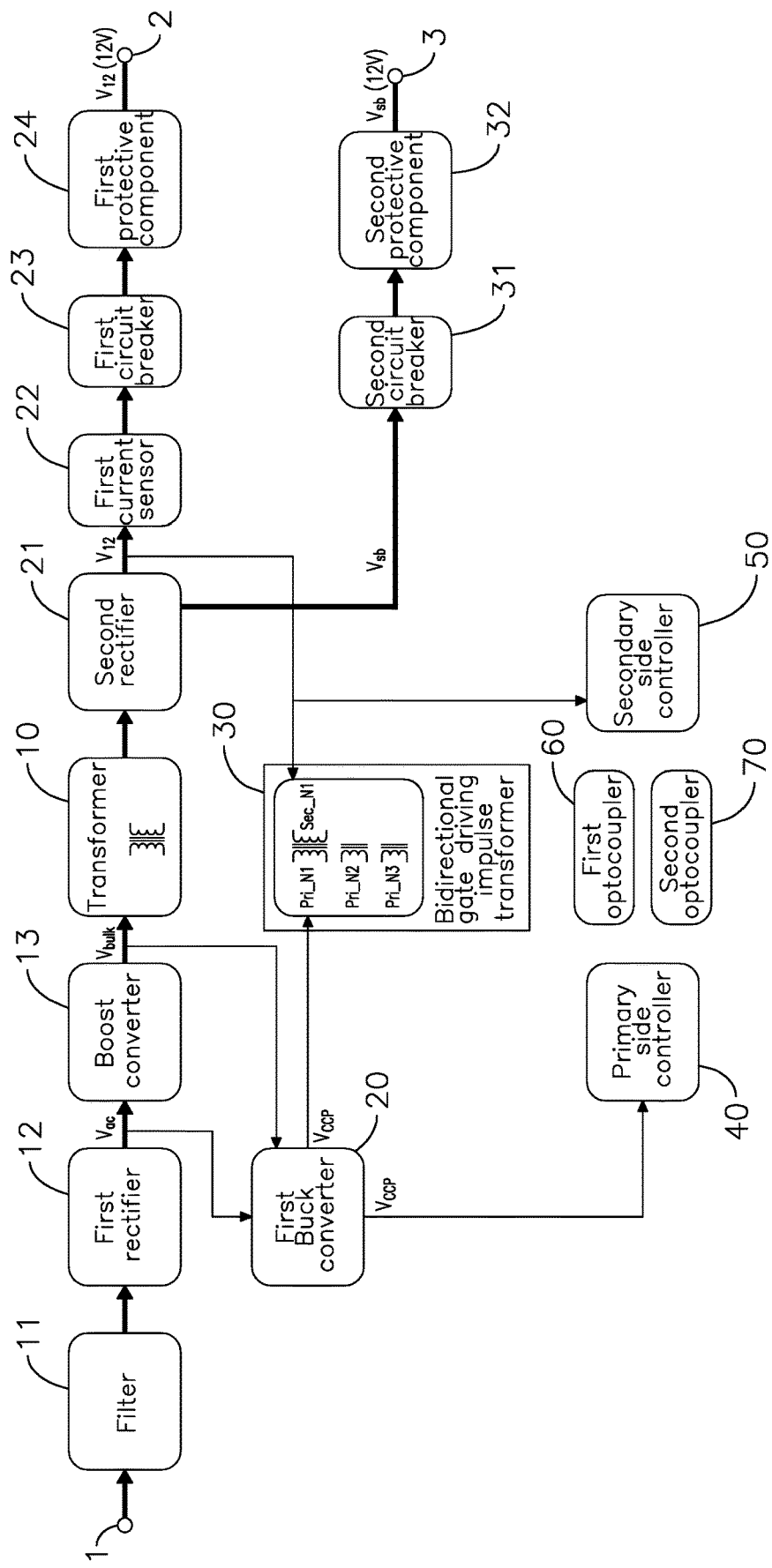
FIG. 2 is a second circuit block diagram of the power supply of the present invention.

With reference to FIG. 2, the thick lines in FIG. 2 represent paths of how the output voltage flows in the power supply, and the thin lines represent paths of how a power voltage flows in the power supply, for denoting internal workings of the power supply. The power voltage is used to power the power supply itself. An inlet of the first Buck converter 20 is electrically connectable to the outlet of the first rectifier 12, the inlet of the Boost converter 13, and/or the outlet of the Boost converter 13 and the inlet of the transformer 10. An outlet of the first Buck converter 20 is electrically connected to the primary side controller 40 and the bidirectional gate driving impulse transformer 30 respectively. The first voltage $V_{ac}$ and/or the second voltage $V_{bulk}$ are bucked down to the power voltage $V_{ccp}$ by the first Buck converter 20. The power voltage $V_{ccp}$ powers the primary side controller 40 and the bidirectional gate driving impulse transformer 30.

The bidirectional gate driving impulse transformer 30 has a first primary side gate driver winding Pri_N1, a second primary side gate driver winding Pri_N2, a third primary side gate driver winding Pri_N3, and a secondary side gate driver winding Sec_N1. The bidirectional gate driving impulse transformer 30 can be powered by the power voltage $V_{ccp}$ from the first Buck converter 20 or by the output voltage from the transformer 10. The DC power source is voltage-transformed by the transformer 10. The transformer 10 is driven by the first primary side gate driver winding Pri_N1 and the second primary side gate driver winding Pri_N2.

Figure 3:
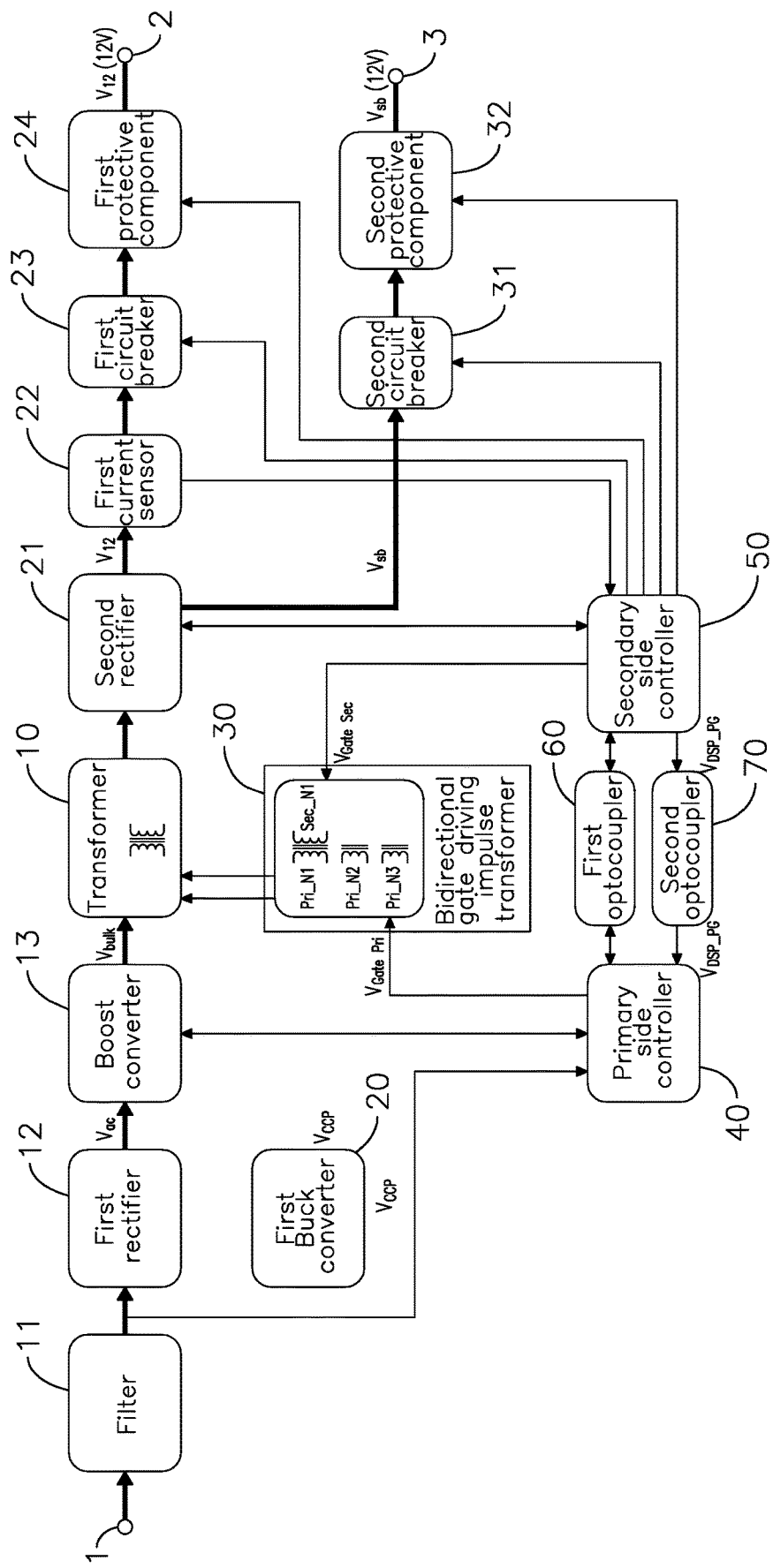
FIG. 3 is a third circuit block diagram of the power supply of the present invention.

With reference to FIG. 3, the thick lines in FIG. 3 represent paths of how the output voltage flows in the power supply, and the thin lines represent paths of how the power voltage flows in the power supply, for denoting internal workings of the power supply. The primary side controller 40 is connected with the first rectifier 12, the Boost converter 13, and the bidirectional gate driving impulse transformer 30. The primary side controller 40 is able to receive corresponding sensing signal from the first voltage $V_{ac}$ and the second voltage $V_{bulk}$, and outputs a primary side control signal $V_{Gate\_Pri}$ to the third primary side gate driver winding Pri_N3 of the bidirectional gate driving impulse transformer 30. The third primary side gate driver winding Pri_N3 drives the first primary side gate driver winding Pri_N1 and the second primary side gate driver winding Pri_N2.

The secondary side controller 50 is connected to the second rectifier 21, the first current sensor 22, the first circuit breaker 23, the second circuit breaker 31, the first protective component 24, the second protective component 32, and the bidirectional gate driving impulse transformer 30. The secondary side controller 50 can current sense the rectified output voltage from the second rectifier 21, and can output a secondary side control signal $V_{Gate\_Sec}$ to the secondary side gate driver winding Sec_N1. The secondary side gate driver winding Sec_N1 drives the first primary side gate driver winding Pri_N1 and the second primary side gate driver winding Pri_N2. Furthermore, the secondary side controller 50 can control whether the first circuit breaker 23, the second circuit breaker 31, the first protective component 24, and the second protective component 32 stay on or off. The first primary side gate driver winding Pri_N1, the second primary side gate driver winding Pri_N2, the third primary side gate driver winding Pri_N3, and the secondary side gate driver winding Sec_N1 each connect an electronic switch in series. The primary side controller 40 is controlled by the primary side control signal $V_{Gate\_Pri}$, controlling on and off of the electronic switch of the third primary side gate driver winding Pri_N3. The secondary side controller 50 is controlled by the secondary side control signal $V_{Gate\_Sec}$, controlling on and off of the electronic switch of the secondary side gate driver winding Sec_N1.

The first optocoupler 60 is connected between the primary side controller 40 and the secondary side controller 50, providing a bidirectional signal transportation between the primary side controller 40 and the secondary side controller 50, and electrically isolating the primary side and the secondary side of the present invention. In the embodiment of the present invention, the first optocoupler 60 has three signal transportation paths from the primary side controller 40 to the secondary side controller 50 and one signal transportation path from the secondary side controller 50 to the primary side controller 40. The three signal transportation paths from the primary side controller 40 to the secondary side controller 50 is responsible for transporting a first voltage signal ACOK for the stable first voltage $V_{ac}$, a second voltage signal BulkOK for the stable second voltage $V_{bulk}$, and an RX signal from the primary side controller 40 to the secondary side controller 50. The one signal transportation path from the secondary side controller 50 to the primary side controller 40 is responsible for transporting a TX signal from the secondary side controller 50 to the primary side controller 40.

The second optocoupler 70 is connected between the side on controller 40 and the secondary side controller 50, also providing a unidirectional signal transportation from the secondary side controller 50 to the primary side controller 40, and electrically isolating the primary side and the secondary side of the present invention. In the embodiment of the present invention, the second optocoupler 70 has a signal transportation path from the secondary side controller 50 to the primary side controller 40. A secondary side working signal is transported through the signal transportation path from the secondary side controller 50 to the primary side controller 40. The second optocoupler 70 can be viewed as a unidirectional isolating communicator between the primary side controller 40 and the secondary side controller 50.

Figure 4:
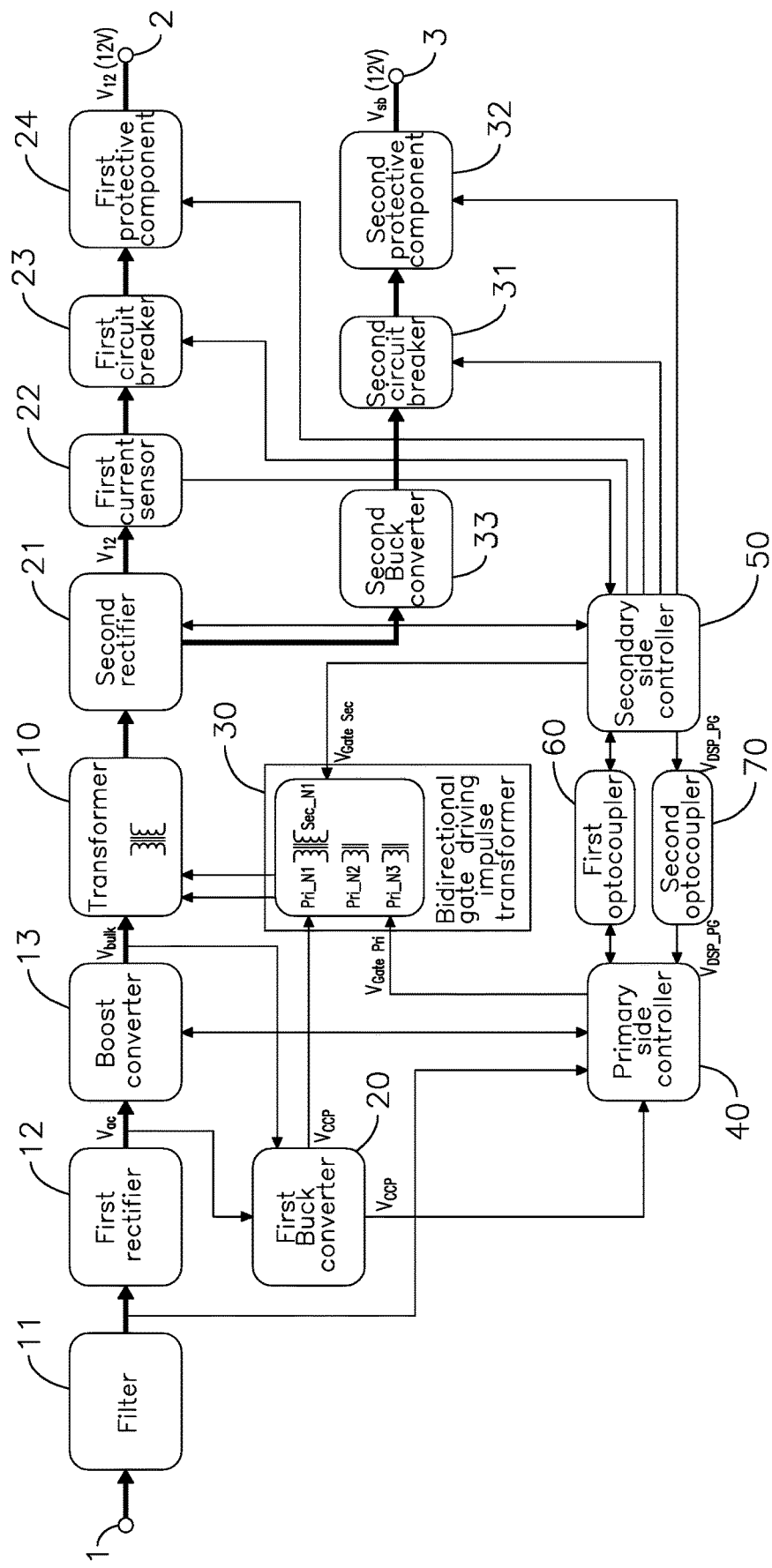
FIG. 4 is a circuit block diagram of another embodiment of the power supply of the present invention.

With reference to FIG. 4, in another embodiment of the present invention, a second Buck converter 33 is connectable between the second rectifier 21 and the secondary power outlet 3. An inlet of the second Buck converter 33 is electrically connectable to the outlet of the second rectifier 21, and an outlet of the second Buck converter 33 is electrically connectable to an inlet of the second circuit breaker 31. The rectified output voltage from the second rectifier 21 is bucked by the second Buck converter 33, providing different power voltages through the major power outlet 2 and the secondary power outlet 3 of the power supply. For instance, in an example wherein the transformer 10 voltage-transforms the DC power source into the output voltage at 12 V, the second Buck converter 33 can further buck down the rectified output voltage from the second rectifier 21 to 5 V. In other words, the major output voltage $V_{12}$ is 12 V, and the secondary output voltage $V_{sb}$ is 5 V. A power voltage of 12 V is then provided by the power supply through the major power outlet 2, and another power voltage of 5 V is then provided by the power supply through the secondary power outlet 3. The two power voltages of 12 V and 5 V would power any back-end electronics to function.

Figure 5:
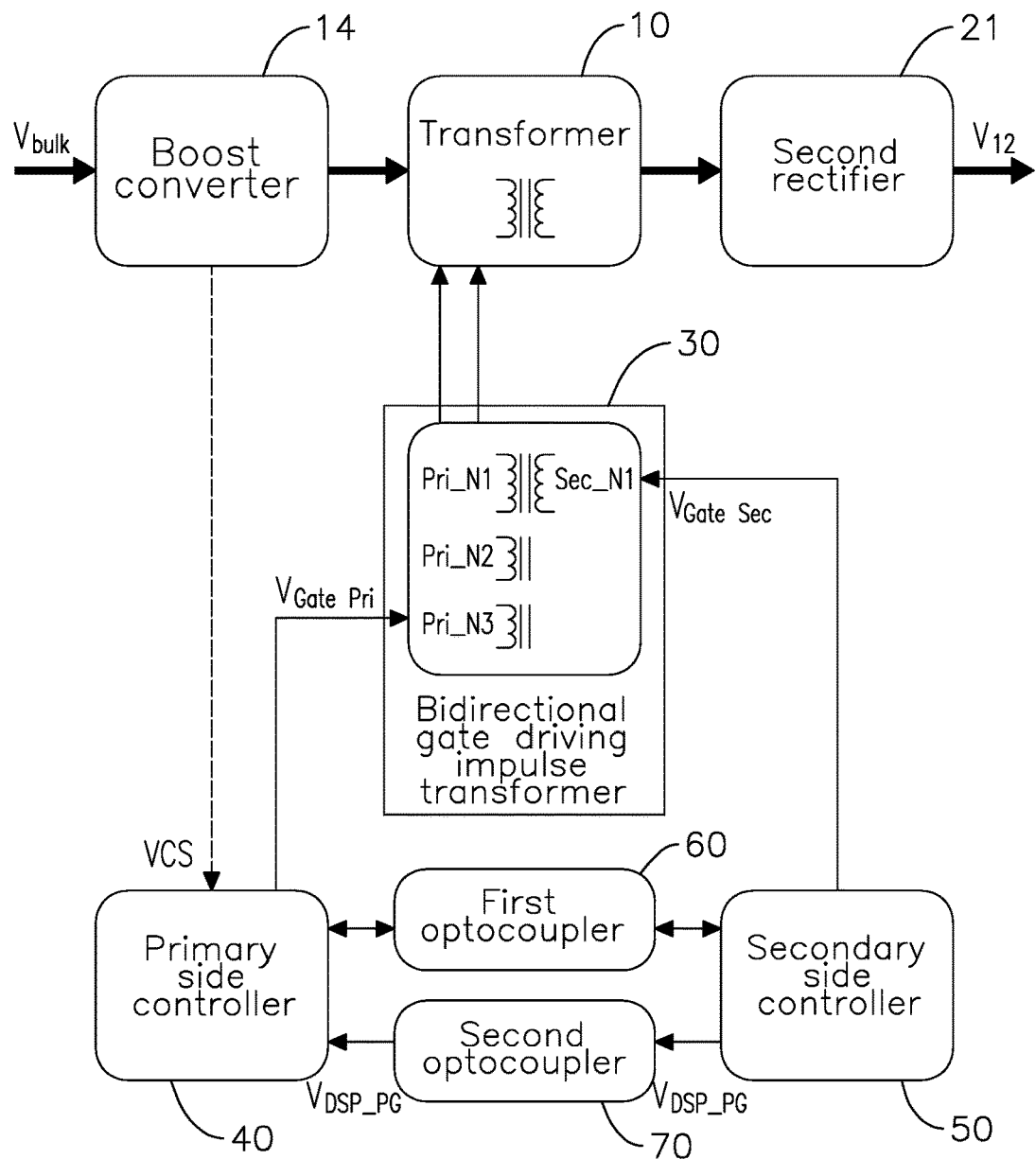
FIG. 5 is a circuit block diagram of a current sensing operation at a primary side of transformer.

With reference to FIG. 5, in a preferred embodiment of the present invention, a second current sensor 14 is connectable between the transformer 10 and the Boost converter 13, outputting a current sampling signal VCS from the second current sensor 14 to the primary side controller 40. The second current sensor 14 is able to check whether the inlet of the transformer 10 is taking in overcurrent in order to prevent back-end component from being damaged, and to prevent an efficiency of the power supply from any interference.

The primary side controller 40 is able to output the primary side controller signal $V_{Gate\_Pri}$ to the third primary side gate driver winding Pri_N3 of the bidirectional gate driving impulse transformer 30 on the primary side of the transformer 10 in the power supply. The third primary side gate driver winding Pri_N3 is then able to drive the first primary side gate driver winding Pri_N1 and the second primary side gate driver winding Pri_N2. The secondary side controller 50 is able to output the secondary side controller signal $V_{Gate\_Sec}$ to the secondary side gate driver winding Sec_N1. The secondary side gate driver winding Sec_N1 is then able to drive the first primary side gate driver winding Pri_N1 and the second primary side gate driver winding Pri_N2. In other words, through the bidirectional gate driving impulse transformer 30, both the primary side controller 40 and the secondary side controller 50 are able to control whether the transformer 10 voltage-transforms. Therefore, the second current sensor 14 on the primary side of the transformer 10 is able to transport the current sampling signal VCS to the primary side controller 40. The primary side controller 40 would determine whether to stop the transformer 10 according to the current sampling signal VCS, and control the transformer 10 through the third primary side gate driver winding Pri_N3. When the primary side controller 40 determined on the primary side of the transformer 10 is taking abnormal current according to the current sampling signal VCS, the primary side controller 40 is able to short the third primary side gate driver winding Pri_N3. Since the third primary side gate driver winding Pri_N3 is shorted, the secondary side controller signal $V_{Gate\ Sec}$ from the secondary side controller 50 is unable to send the secondary side gate driver winding Sec_N1 voltage to drive the first primary side gate driver winding Pri_N1 and the second primary side gate driver winding Pri_N2 for driving the transformer 10.

Compared to a conventional power supply, the power supply of the present invention can function without mounting additional isolating components, such as a current transformer, to transport the current sampling signal VCS from the primary side of the transformer 10 to the secondary side controller 50 on the secondary side, and to electrically isolate the primary side and the secondary side of the transformer 10. In the present invention, sensing signal on the primary side can be received and processed by the primary side controller 40, and sensing signal on the secondary side can also be received and processed by the secondary side controller 50. Without using any isolating components, the present invention is smaller in size compared to the conventional power supply, decreasing weights for the power supply and decreasing production cost for the power supply.

Figure 6:
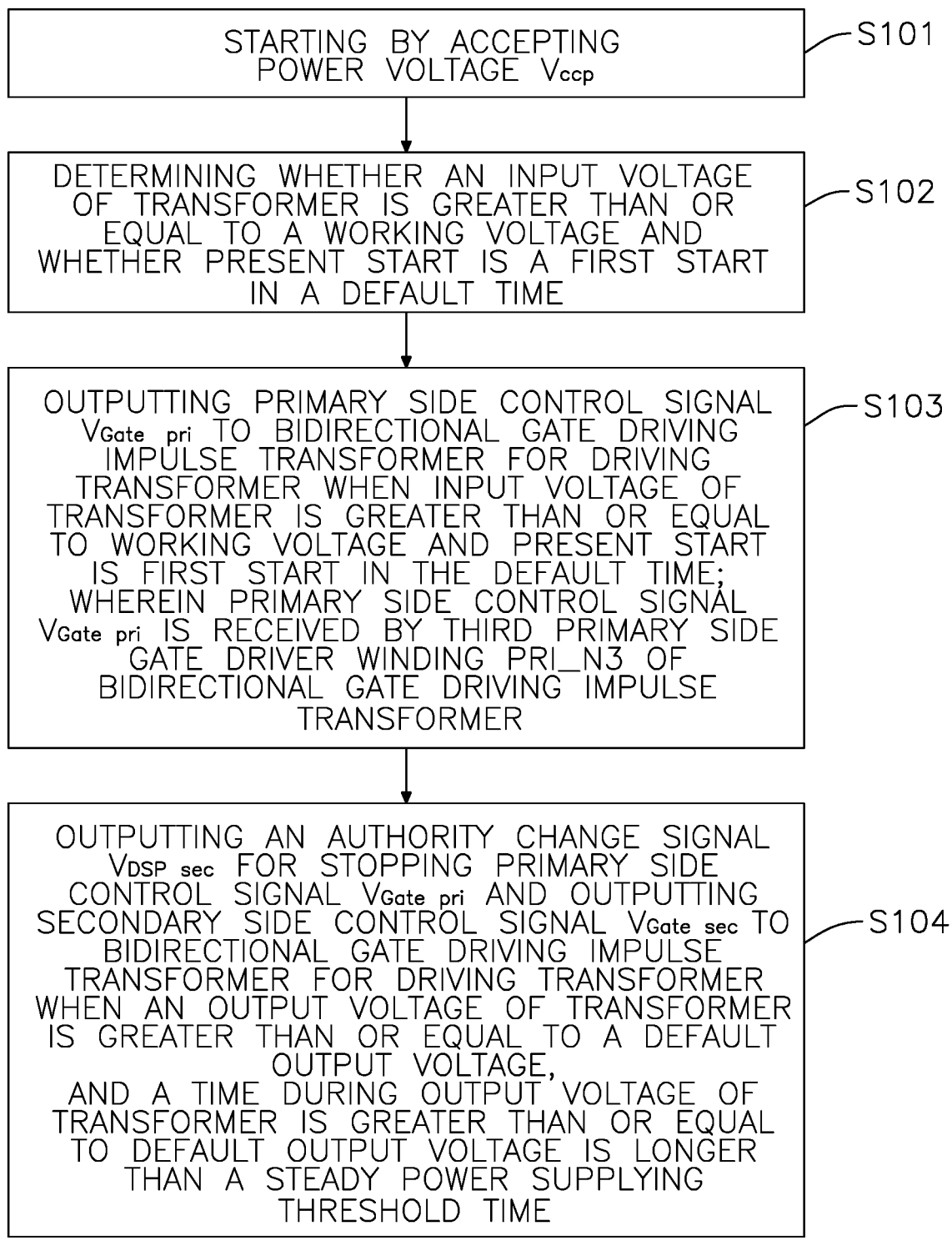
FIG. 6 is a flow chart of a control method of the power supply of the present invention.

With reference to FIG. 6, the following steps detail a control method for the power supply of the present invention in practice. Steps S101 to S103 are executed by the primary side controller 40, and step S104 is executed by the secondary side controller 50. The control method for the power supply includes:

Step S101: starting by accepting the power voltage $V_{ccp}$;

Step S102: determining whether an input voltage of the transformer 10 is greater than or equal to a working voltage and whether a present start is a first start in a default time;

Step S103: outputting the primary side control signal $V_{Gate\ Pri}$ to the bidirectional gate driving impulse transformer 30 for driving the transformer 10 when the input voltage of the transformer 10 is greater than or equal to the working voltage and the present start is the first start in the default time; wherein the primary side control signal $V_{Gate\ Pri}$ is received by the third primary side gate driver winding Pri_N3 of the bidirectional gate driving impulse transformer 30;

Step S104: outputting an authority change signal $V_{DSP\ Sec}$ for stopping the primary side control signal $V_{Gate\ Pri}$ and outputting the secondary side control signal $V_{Gate\ Sec}$ to the bidirectional gate driving impulse transformer 30 for driving the transformer 10 when an output voltage of the transformer 10 is greater than or equal to a default output voltage, and a time during which the output voltage of the transformer 10 is greater than or equal to the default output voltage is longer than a steady power supplying threshold time.

Figure 7A:
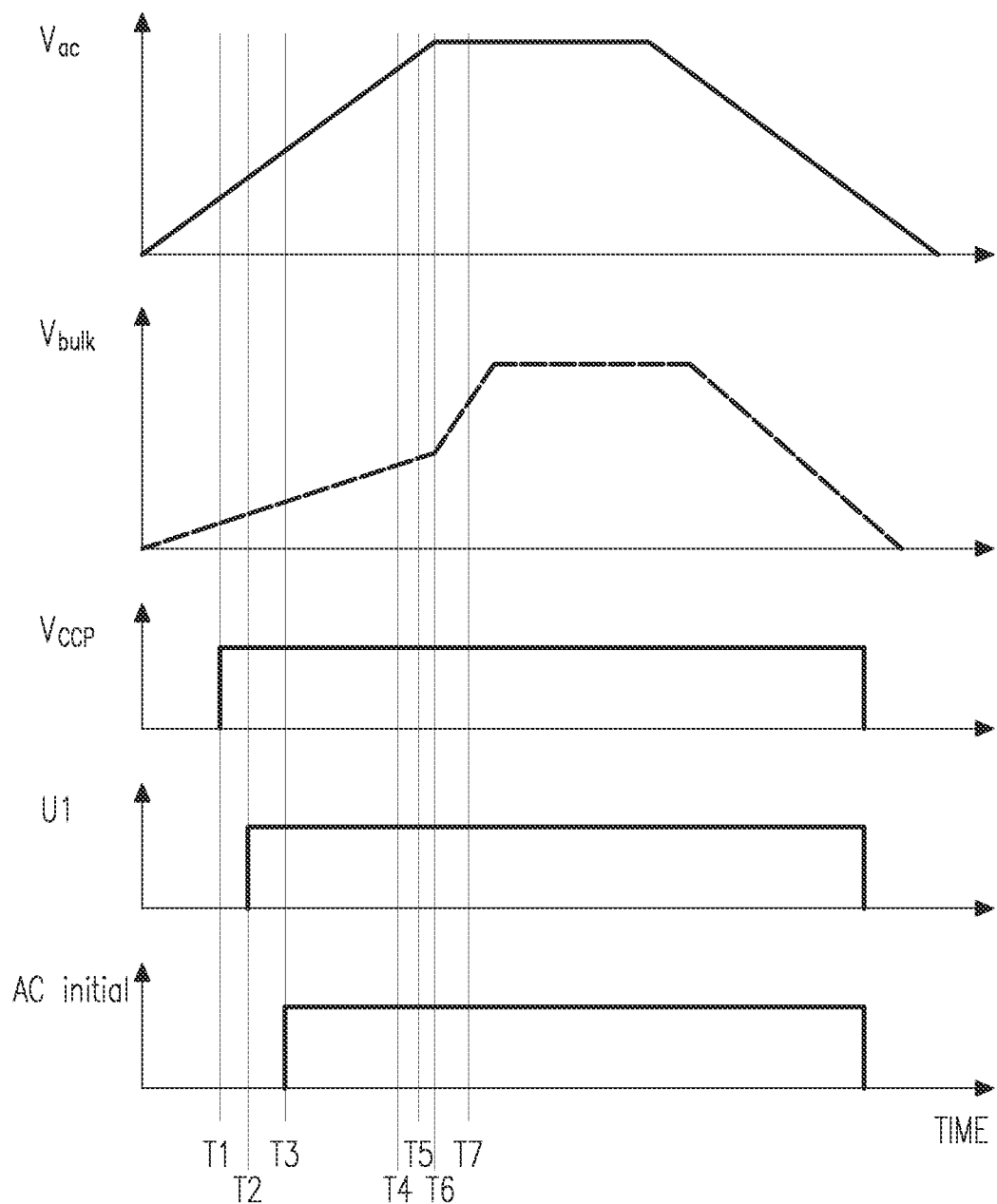
FIG. 7A is a first sequence diagram of the power supply of the present invention.
Figure 7B:
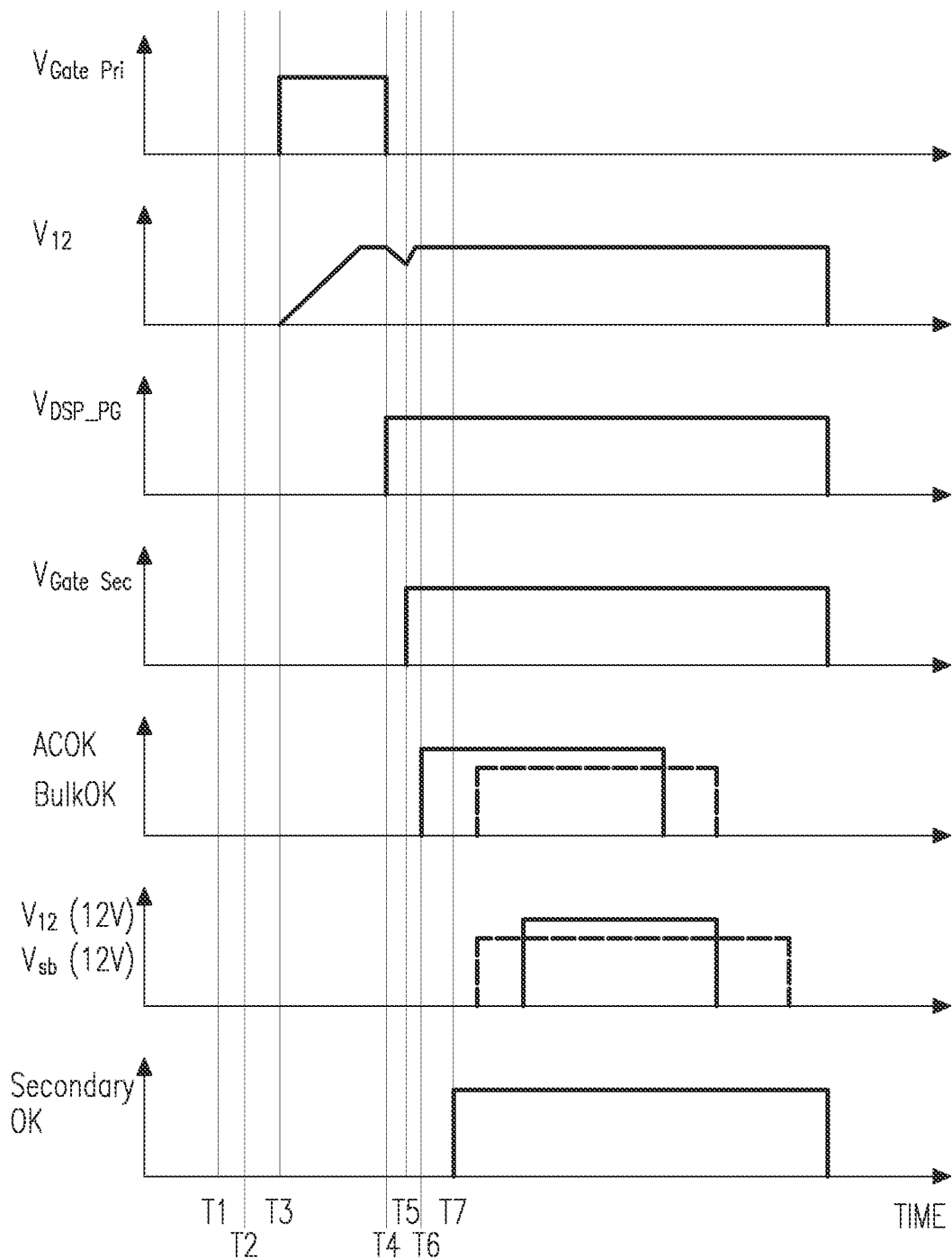
FIG. 7B is a second sequence diagram of the power supply of the present invention.
Figure 8:
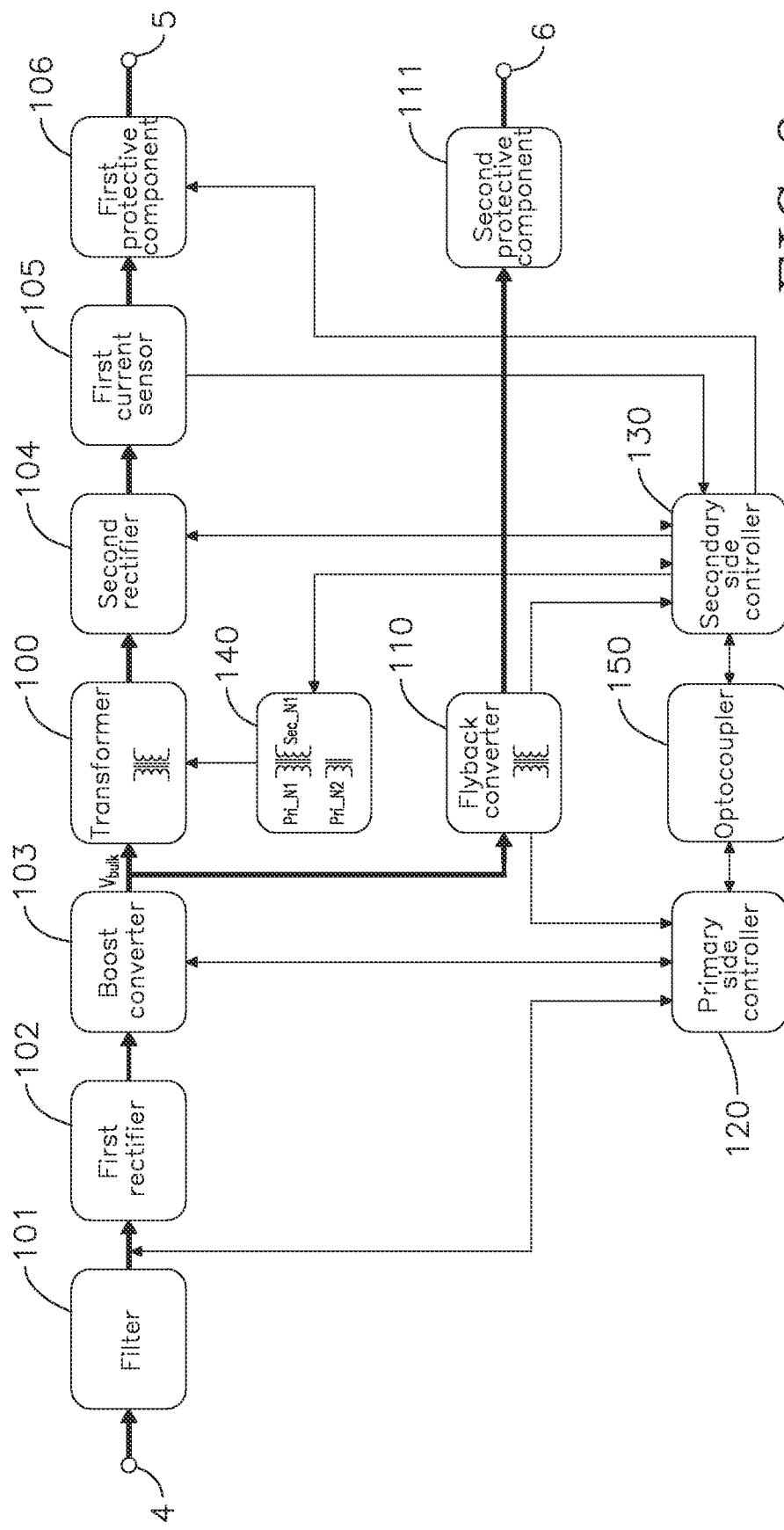
FIG. 8 is a circuit block diagram of a conventional power supply.
Figure 9:
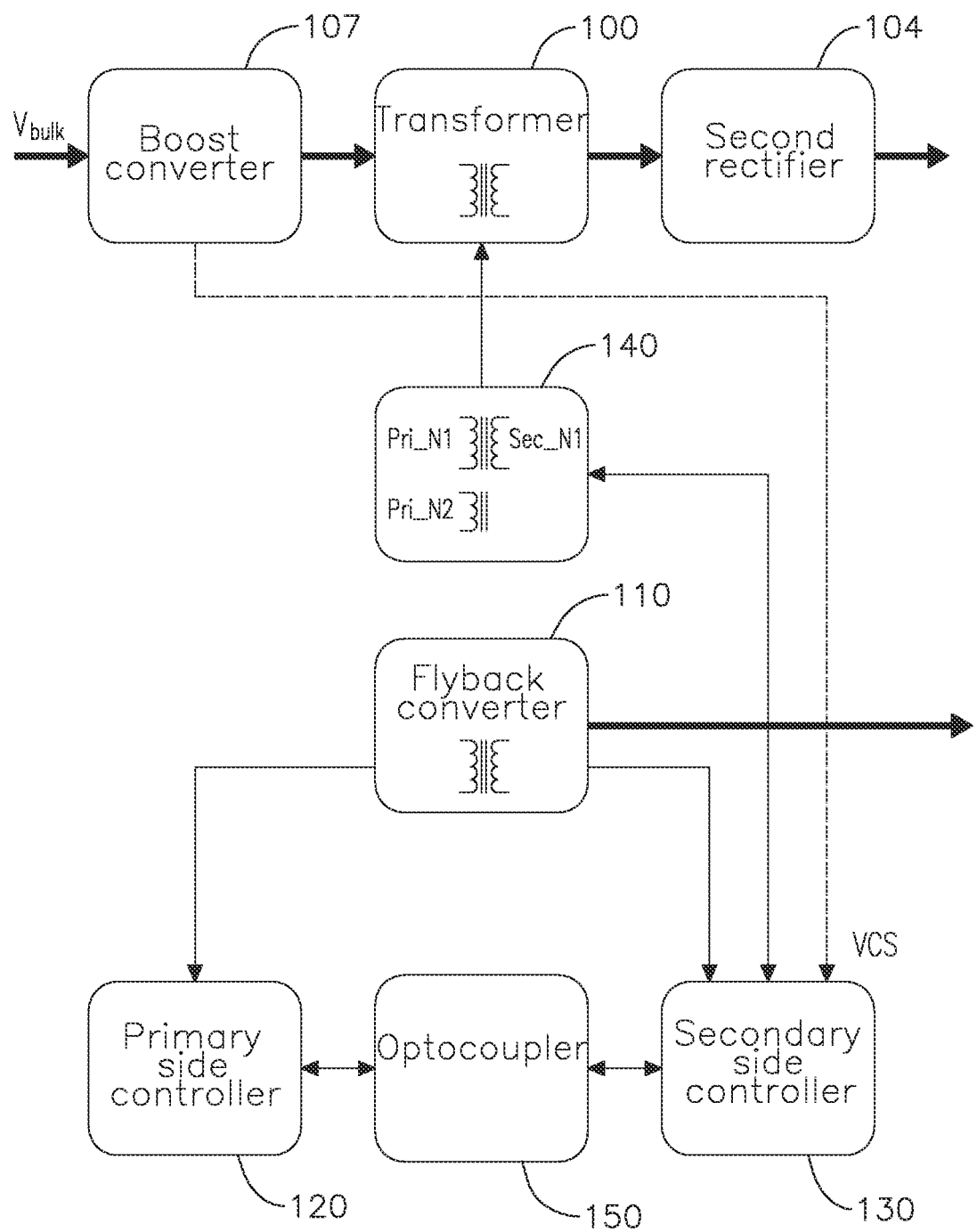
FIG. 9 is a circuit block diagram of a conventional current sensing operation at a primary side of transformer.

With reference to FIGS. 7A and 7B, the following sequence diagrams would explain Step 101 to Step 104 in detail.

Corresponding to Step 101, an AC power source would first enter the power supply through the power inlet 1, and then the AC power source would be filtered by the filter 11 and rectified by the first rectifier 12, turning into the first voltage $V_{ac}$. The Boost converter 13 would then boost the first voltage $V_{ac}$ into the second voltage $V_{bulk}$. When the Buck converter 20 determines that the first voltage $V_{ac}$ or the second voltage $V_{bulk}$ is greater than or equal to a starting voltage, the first Buck converter 20 starts to work, wherein the first Buck converter 20 bucks the first voltage $V_{ac}$ from the first rectifier 12 or the second voltage $V_{bulk}$ from the Boost converter 13 down to the power voltage $V_{ccp}$. The starting voltage corresponding to the first voltage $V_{ac}$ or the second voltage $V_{bulk}$ can be simultaneously different. The starting voltage is an adjustable default value stored inside the Buck converter 20. The adjustable default value is determined by electronic components such as resistors, capacitors, diodes, inductors or transformers inside of the Buck converter. Details regarding the adjustable default value stored inside the Buck converter 20 would be omitted, as this area of knowledge is commonly known.

As an example, if the starting voltage for the first voltage $V_{ac}$ is 65 V, and at time T1 in FIGS. 7A and 7B, the first voltage $V_{ac}$ reached 65 V, then the first Buck converter 20 is started by the first voltage $V_{ac}$. The first Buck converter 20 would then buck down the first voltage $V_{ac}$ to the power voltage $V_{ccp}$, powering the primary side controller 40 and the bidirectional gate driving impulse transformer 30. Similarly, if the starting voltage for the second voltage $V_{bulk}$ is 100 V, and at time T1 in FIGS. 7A and 7B, the second voltage $V_{bulk}$ reached 100 V, then the first Buck converter 20 is started by the second voltage $V_{bulk}$. The first Buck converter 20 would then buck down the second voltage $V_{bulk}$ to the power voltage $V_{ccp}$, powering the primary side controller 40 and the bidirectional gate driving impulse transformer 30.

Corresponding to Step 102, the primary side controller 40 in FIG. 7A is represented as U1. The primary side controller 40 starts to function after powered by the power voltage $V_{ccp}$ at time T2. Once started, the primary side controller 40 determines whether the first voltage $V_{ac}$ or the second voltage $V_{bulk}$ at the power inlet 1 is greater than or equal to a working voltage, and whether the present start for the primary side controller 40 is a first start in a default time. The working voltage corresponding to the first voltage $V_{ac}$ or the second voltage $V_{bulk}$ can be simultaneously different, and time T1 to time T2 is time taken for the primary side controller 40 to start internally. The working voltage and the default time are adjustable default values stored inside the primary side controller 40. The working voltage and the default time can be adjusted according to different powering needs.

Corresponding to Step 103, time T2 to time T3 is a determining time taken for the primary side controller 40 to sense and initialize a determination on the first voltage $V_{ac}$ or the second voltage $V_{bulk}$. As an example, if the first voltage $V_{ac}$ reaches the working voltage, and the present start of the primary side controller 40 is a first start in a default time, then the primary side controller 40 would continuously view a first starting signal, denoted as AC initial, as effective at time T3 until the primary side controller 40 is switched off, and simultaneously output the primary side control signal $V_{Gate\ Pri}$ to the third primary side gate driver winding Pri_N3 of the bidirectional gate driving impulse transformer 30 at time T3.

Furthermore, the first starting signal is stored in the primary side controller 40. The primary side controller 40 uses the first starting signal to determine whether the present start is a first start in the default time. By determining an ending time from the first starting signal from previous effective times, and by determining whether time gaps of a present time is greater than or equal to the default time, whether the present start is a first start in the default time for the primary side controller 40 is determined. As an example the default time is set to be one minute, if a time gap between the ending time from the first starting signal from pervious effective time and time T2 is less than a minute, then the present start is not a first start in the default time. If the time gap between the ending time from the first starting signal from pervious effective time and time T2 is greater than or equal to a minute, then the present start is a first start in the default time.

The primary side control signal $V_{Gate\_Pri}$ is outputted from the primary side controller 40 at time T3 to the third primary side gate driver winding Pri_N3 of the bidirectional gate driving impulse transformer 30. The first primary side gate driver winding Pri_N1 and the second primary side gate driver winding Pri_N2 are driven by the third primary side gate driver winding Pri_N3. Furthermore, the transformer 10 is driven by the first primary side gate driver winding Pri_N1 and the second primary side gate driver winding Pri_N2 to voltage-transform the input voltage (or input power), generating the output voltage. Since in the embodiment of the present invention the major output voltage $V_{12}$ is the output voltage in FIG. 1, the major output voltage $V_{12}$ is generated starting at time T3 in FIG. 7A. The transformer 10 is bucked by the primary side controller 40 through the bidirectional gate driving impulse transformer 30, slowly and steadily increasing the major output voltage $V_{12}$ outputted by the transformer 10, and preventing a low voltage or an overvoltage on the secondary side of the transformer 10.

Corresponding to Step 104, the output voltage of the transformer 10 is determined to reach the default output voltage at time T4 by the secondary side controller 50, and the time the output voltage of the transformer 10 reaches the default output voltage is longer than the steady power supplying threshold time. Therefore, the authority change signal $V_{DSP\_Sec}$ is outputted from the secondary side controller 50 at time T4 to the primary side controller 40, and after an authority changing time has passed, the secondary side control signal $V_{Gate\_Sec}$ is also outputted from the secondary side controller 50 at time T5 to the secondary side gate driver winding Sec_N1 of the bidirectional gate driving impulse transformer 30. The first primary side gate driver winding Pri_N1 and the second primary side gate driver winding Pri_N2 are driven by the secondary side gate driver winding Sec_N1. Furthermore, the transformer 10 is driven by the first primary side gate driver winding Pri_N1 and the second primary side gate driver winding Pri_N2 to voltage-transform the input voltage (or input power). An authority of the transformer 10 is switched from the primary side controller 40 to the secondary side controller 50. The default output voltage, the steady power supplying threshold time, and the authority changing time are adjustable default values stored in the secondary side controller 50. The default output voltage, the steady power supplying threshold time, and the authority changing time can be adjusted according to different powering needs.

In the preferred embodiment of the present invention, when the primary side controller 40 receives the authority change signal $V_{DSP\_Sec}$ at time T4, the primary side controller 40 stops outputting the primary side control signal $V_{Gate\_Pri}$ to the bidirectional gate driving impulse transformer 30. In order to prevent the authority of transformer 10 from encountering any anomalies, the transformer 10 simultaneously receives the primary side control signal $V_{Gate\_Pri}$ and the secondary side control signal $V_{Gate\_Sec}$, after outputting the authority change signal $V_{DSP\_Sec}$ the secondary side controller 50 needs the authority changing time before outputting the secondary side control signal $V_{Gate\_Sec}$. Furthermore, the primary side controller 40 is able to short the third primary side gate driver winding Pri_N3, causing the primary side control signal $V_{Gate\_Pri}$ of the primary side controller 40 unable to build up voltage in the third primary side gate driver winding Pri_N3, preventing the third primary side gate driver winding Pri_N3 from driving the first primary side gate driver winding Pri_N1 and the second primary side gate driver winding Pri_N2, thus preventing the transformer 10 to be driven by the first primary side gate driver winding Pri_N1 and the second primary side gate driver winding Pri_N2.

Without the primary side control signal $V_{Gate\_Pri}$ from the side controller 40 and the secondary side control signal $V_{Gate\_Sec}$ from the secondary side controller 50, from time T4 to time T5 the major output voltage $V_{12}$ would decrease slightly. To avoid the major output voltage $V_{12}$ from unstably damaging electronics behind the major power outlet 2 from time T4 to time T5, when outputting the authority change signal $V_{DSP\_Sec}$, the secondary side controller 50 can further short the first circuit breaker 23, preventing the unstable major output voltage $V_{12}$ from outputting from the major power outlet 2. Similarly, the secondary side controller 50 can also short the second circuit breaker 31, preventing the unstable secondary output voltage $V_{sb}$ from outputting from the secondary power outlet 3.

After the authority changing time has passed, the secondary side control signal $V_{Gate\_Sec}$ is outputted from the secondary side controller 50 starting from time T5. The transformer 10 is controlled by the secondary side controller 50 through the bidirectional gate driving impulse transformer 30, leading to an increase in the major output voltage $V_{12}$ starting from time T5. The major output voltage $V_{12}$ would reach the default output voltage at time T6. The secondary side controller 50 would further control the first circuit breaker 23 to connect, re-outputting the stable major output voltage $V_{12}$ from the major power outlet 2. Similarly, the secondary side controller 50 would also control the second circuit breaker 31 to connect, re-outputting the stable secondary output voltage $V_{sb}$ from the secondary power outlet 3. A time gap between time T4 and time T6 is extremely short, making the power supply practically uninterrupted.

The authority of the transformer 10 is switched to the secondary side controller 50 starting from time T6. The primary side controller 40 on the other hand would still be able to sense whether the first voltage $V_{ac}$ and the second voltage $V_{bulk}$ are providing electricity nominally on the primary side of the transformer 10. When the first voltage $V_{ac}$ is providing electricity nominally, a first voltage signal ACOK for the stable first voltage $V_{ac}$ is transported from the primary side controller 40 to the secondary side controller 50 through the first optocoupler 60. When the second voltage $V_{bulk}$ is providing electricity nominally, a second voltage signal BulkOK for the stable second voltage $V_{bulk}$ is transported from the primary side controller 40 to the secondary side controller 50 through the first optocoupler 60. When the transformer 10 is determined to provide electricity stably by the secondary side controller 50, the secondary side controller 50 would be able to generate a secondary side stable signal denoted as SecondaryOK. After generating the secondary side stable signal SecondaryOK at time T7, the secondary side would be able to control sequence of the major power outlet 2 and the secondary power outlet 3 through controlling the first circuit breaker 23 and the second circuit breaker 31. Please note in FIG. 7B, the major output voltage $V_{12}$ (12V) of the major power outlet 2 and the secondary output voltage $V_{sb}$ (12V) of the secondary power outlet 3 in the sequence diagram are recorded for sequence demonstrations instead of for comparing voltages against each other.

In conclusion, in the power supply of the present invention, the primary side controller 40 is powered by the first Buck converter 20, the secondary side controller 50 is powered by the transformer 10, and both the primary side controller 40 and the secondary side controller 50 can control the transformer 10 through the bidirectional gate driving impulse transformer 30. Compared to a conventional power supply, which includes the isolation components, making the conventional power supply bigger in size, more power consuming, and higher in cost, the present invention avoids additionally mounting a Flyback converter to power the primary side controller 40 and the secondary side controller 50 respectively. By avoiding additionally mounting a Flyback converter, the present invention is able to avoid additional power consumption required by the Flyback converter, to increase the overall power conversion efficiency for the power supply, and to minimize the size of the power supply. On the other hand, since the primary side controller 40 is able to control the transformer 10, the sensing signal on the primary side of the transformer 10 can be received by the primary side controller 40, and used accordingly to control the transformer 10. When the sensing signal on the primary side shows abnormalities in voltage or currents, the sensing signal is transported to the secondary side controller 50 without any isolating components, increasing a reaction time toward abnormal situations, and decreasing additional power loss transporting the sensing signal from the primary side to the secondary side through the isolating components.

The description above relating to the preferred embodiment of the present invention are not limitations to what is claimed for the invention, but rather a demonstrating example of the present invention. Despite the preferred embodiment of the present invention has been disclosed, anyone with technical knowledge is welcomed to make slight changes or modifications based on what is disclosed. However, anything related by definition to what is claimed, or any equivalent modifications based from what is claimed are both encompassed by what is claimed.

What is claimed is:

1. A power supply having a bidirectional gate driving impulse transformer, comprising:
    a transformer, including an inlet and an outlet, wherein the inlet is electrically connected to a power inlet, the outlet is electrically connected to a major power outlet; and the transformer voltage-transforms a power input of the power inlet to generate an output voltage;
    a first Buck converter, electrically connecting between the power inlet and the inlet of the transformer, generating a power voltage by bucking the power input from the power inlet;
    the bidirectional gate driving impulse transformer, electrically connecting the transformer and the first Buck converter, and powered by either the power voltage or the output voltage;
    a primary side controller, electrically connecting the first buck converter and the bidirectional gate driving impulse transformer, and powered by the power voltage;
    a secondary side controller, electrically connecting the outlet of the transformer and the bidirectional gate driving impulse transformer, and powered by the output voltage;
    a first optocoupler, electrically connecting between the primary side controller and the secondary side controller, providing a bidirectional signal transportation between the primary side controller and the secondary side controller;
    a second optocoupler, electrically connecting between the primary side controller and the secondary side controller, providing a one-directional signal transportation from the secondary side controller to the primary side controller; wherein
    a primary side control signal is outputted from the primary side controller to the bidirectional gate driving impulse transformer, a secondary side control signal is outputted from the secondary side controller to the bidirectional gate driving impulse transformer, and the transformer is driven according to either the primary side control signal or the secondary side control signal received by the bidirectional gate driving impulse transformer.

2. The power supply as claimed in claim 1, wherein the power supply further comprises:
    a filter, wherein an inlet of the filter is electrically connected to the power inlet, filtering the power input of the power inlet;
    a first rectifier, wherein an inlet of the first rectifier is electrically connected to an outlet of the filter, rectifying the filtered power input and outputting a first voltage;
    a Boost converter, wherein an inlet of the Boost converter is electrically connected to an outlet of the first rectifier, and an outlet of the Boost converter is electrically connected to the inlet of the transformer, boosting the first voltage and outputting a second voltage.

3. The power supply as claimed in claim 2, wherein the first Buck converter is electrically connected to either the outlet of the first rectifier or the outlet of the Boost converter; the first Buck converter bucks either the first voltage of the first rectifier or the second voltage of the Boost converter, generating the power voltage.

4. The power supply as claimed in claim 1, wherein the bidirectional gate driving impulse transformer includes a first primary side gate driver winding, a second primary side gate driver winding, a third primary side gate driver winding, and a secondary side gate driver winding;
    the primary side controller outputs the primary side control signal to the third primary side gate driver winding of the bidirectional gate driving impulse transformer; the third primary side gate driver winding drives the first primary side gate driver winding and the second primary side gate driver winding; and the first primary side gate driver winding and the second primary side gate driver winding drive the transformer for voltage-transformations;
    the secondary side controller outputs the secondary side control signal to the secondary side gate driver winding of the bidirectional gate driving impulse transformer; the secondary side gate driver winding drives the first primary side gate driver winding and the second primary side gate driver winding; and the first primary side gate driver winding and the second primary side gate driver winding drive the transformer for voltage-transformations.

5. The power supply as claimed in claim 1, wherein a second rectifier is mounted between the transformer, the major power outlet, and a secondary power outlet; an inlet of the second rectifier is electrically connected to the outlet of the transformer, and an outlet of the second rectifier is electrically connected to the major power outlet and the secondary power outlet;

the second rectifier rectifies the output voltage, then respectively outputs a major output voltage from the major power outlet and a secondary output voltage from the secondary power outlet.

6. The power supply as claimed in claim 5, wherein between the outlet of the second rectifier and the major power outlet, the power supply comprises:
a first current sensor, wherein an inlet of the first current sensor is electrically connected to the outlet of the second rectifier;
a first circuit breaker, wherein an inlet of the first circuit breaker is electrically connected to an outlet of the first current sensor;
a first protective component, wherein an inlet of the first protective component is electrically connected to an outlet of the first circuit breaker, and an outlet of the first protective component is electrically connected to the major power outlet.

7. The power supply as claimed in claim 5, wherein between the outlet of the second rectifier and the secondary power outlet, the power supply comprises:
a second circuit breaker, wherein an inlet of the second circuit breaker is electrically connected to the outlet of the second rectifier;
a second protective component, wherein an inlet of the second protective component is electrically connected to an outlet of the second circuit breaker, and an outlet of the second protective component is electrically connected to the secondary power outlet.

8. The power supply as claimed in claim 7, wherein the power supply further comprises a second Buck converter;
an inlet of the second Buck converter is electrically connected to the outlet of the second rectifier, and an outlet of the second Buck converter is electrically connected to the inlet of the second circuit breaker.

9. A control method of a power supply having a bidirectional gate driving impulse transformer, executed by a primary side controller and a secondary side controller, wherein the primary side controller executes steps of:
starting by accepting a power voltage;
determining whether an input voltage of a transformer is greater than or equal to a working voltage, and determining whether a present start is a first start in a default time; and
outputting a primary side control signal to the bidirectional gate driving impulse transformer for driving the transformer when the input voltage of the transformer is greater than or equal to the working voltage and the present start is the first start in the default time; and wherein the secondary side controller executes steps of:
outputting an authority change signal for stopping the primary side control signal and outputting a secondary side control signal to the bidirectional gate driving impulse transformer, for driving the transformer, when an output voltage of the transformer is greater than or equal to a default output voltage, and a time during which the output voltage of the transformer is greater than or equal to the default output voltage is longer than a steady power supplying threshold time.

10. The control method as claimed in claim 9, wherein the primary side controller determines whether the present start of the primary side controller is the first start in the default time according to a first start signal;
wherein whether the present start is the first start in the default time for the primary side controller is determined by an ending time from the first start signal from previous effective times, and whether a time gap of a present time is greater than or equal to the default time.

11. The control method as claimed in claim 9, wherein the primary side control signal is outputted from the primary side controller to a third primary side gate driver winding of the bidirectional gate driving impulse transformer;
wherein the third primary side gate driver winding drives a first primary side gate driver winding and a second primary side gate driver winding;
wherein the first primary side gate driver winding and the second primary side gate driver winding drive the transformer for voltage-transformations;
wherein the secondary side control signal is outputted from the secondary side controller to a secondary side gate driver winding of the bidirectional gate driving impulse transformer; the secondary side gate driver winding drives the first primary side gate driver winding and the second primary side gate driver winding; and the first primary side gate driver winding and the second primary side gate driver winding drive the transformer for voltage-transformations.

12. The control method as claimed in claim 9, wherein when the output voltage of the transformer is greater than or equal to the default output voltage, and the time during which the output voltage of the transformer is greater than or equal to the default output voltage is longer than the steady power supplying threshold time, the secondary side control signal is outputted from the secondary side controller after an authority changing time has passed.

* * * * *